(12) United States Patent
Knight (10) Patent No.: US 7,760,129 B1
(45) Date of Patent: Jul. 20, 2010

(54) SIMULTANEOUS DUAL POLARIZATION RADAR SYSTEM WITH OPTICAL COMMUNICATIONS LINK

(75) Inventor: Michael B. Knight, Enterprise, AL (US)

(73) Assignee: Enterprise Electronics Corporation, Enterprise, AL (US)

( * ) Notice: Subject to any disclaimer, the term of this patent is extended or adjusted under 35 U.S.C. 154(b) by 0 days.

(21) Appl. No.: 12/048,838

(22) Filed: Mar. 14, 2008

(51) Int. Cl.
*G01S 13/95* (2006.01)
(52) U.S. Cl. .................. 342/26 D; 342/26 R; 342/188
(58) Field of Classification Search ............... 342/26 D
See application file for complete search history.

(56) References Cited

U.S. PATENT DOCUMENTS

| | | | |
|---|---|---|---|
| 2,784,383 A | | 3/1957 | Zaleski |
| 4,786,136 A | * | 11/1988 | Cannon ........................ 385/55 |
| 4,909,589 A | * | 3/1990 | Morris ......................... 385/25 |
| 5,134,409 A | * | 7/1992 | De Groot ..................... 342/52 |
| 5,436,989 A | * | 7/1995 | Weinberger et al. ............ 385/33 |
| 5,487,121 A | * | 1/1996 | Miesak ........................ 385/39 |
| 5,500,646 A | * | 3/1996 | Zrnic .......................... 342/188 |
| 5,977,513 A | * | 11/1999 | Findlan .................. 219/121.64 |
| 6,539,162 B1 | * | 3/2003 | Stephenson ................... 386/46 |
| 6,803,875 B1 | * | 10/2004 | Alford et al. ............... 342/26 R |
| 6,859,163 B2 | * | 2/2005 | Alford et al. .............. 342/26 D |
| 7,049,997 B2 | * | 5/2006 | Alford et al. .............. 342/26 R |
| 7,158,072 B1 | * | 1/2007 | Venkatachalam et al. . 342/26 B |
| 7,325,977 B2 | * | 2/2008 | Stevens ........................ 385/60 |
| 7,365,696 B1 | * | 4/2008 | Smeltzer ..................... 343/757 |
| 2008/0165052 A1 | * | 7/2008 | Andersson et al. ........ 342/26 R |

OTHER PUBLICATIONS

R.J. Dovtiak et al., Considerations for for Polarimetric Upgrades to Operational WSR-88D Radars.; J. Atmos. and Oceanic Tech, 2000. 17, 257-278.
Y. Lui et al., The Use of Polarization Data in the Operational Identification of Hydrometeor and Non-Hydrometeor 0 Targets. Preprints, 29th Conf. Radar Meteor. Montreal, Canada: American Meteorological Society 1999: 178-179.
Merrill I. Skolnik, Introduction to Radar Systems. New York 3rd ed 2001.

(Continued)

*Primary Examiner*—Thomas H Tarcza
*Assistant Examiner*—Matthew M Barker
(74) *Attorney, Agent, or Firm*—Russell Carter Gache Maynard Cooper & Gale, PC (57) ABSTRACT

A simultaneous dual polarization radar system is disclosed repositioning critical processing components below the elevation rotary coupler to avoid radar emission pulse train corruption due to waveguide phase error introductions and to fully capitalize on the simultaneous transmission of polarized signals. A fiber optic rotational coupler is introduced to allow an improved alternate data path for data transmission from the receivers to the signal processors and to allow for transmitting reflected signal returns from the receiver subsystem located above the elevation rotary coupler to the radar system processor located below the elevation rotary coupler.

24 Claims, 5 Drawing Sheets

OTHER PUBLICATIONS

J. Vivekanandan et al., Cloud Microphysics Retrieval Using S-Band Dual-Polarization Radar Measurements. Bulletin of American Meteorological Society 1999: 381-388.

Allen Zahrai et al., Implementation of Polarimetric Capability for the WSR-88D (NEXRAD) Radar. Long BEach, CA American Meteorological Society 1997.

D.S. Zrnic et al., Polarimetry for Weather Surveillance Radars. Bulletin of the American Meteorological Society 1999: 389-406.

Hyo-Kyung Kim et al., Rain and Snow Discrimination with X-band Polarimetric Radar, Department of Environmental Atmospheric Science, Feb. 2004.

* cited by examiner

FIG. 1

-- PRIOR ART --

SIMULTANEOUS DUAL POLARIZATION RADAR SYSTEM WITH OPTICAL COMMUNICATIONS LINK

FIELD OF THE INVENTION

The present invention relates generally to weather radar systems. In further particularity the present invention relates to Doppler weather radar systems utilizing dual polarization to enhance reflectivity resolutions of liquid hydrometeors and utilizing a fiber optic rotational coupler.

BACKGROUND OF THE INVENTION

The majority of weather radar systems in operation today utilize a single polarization strategy to enhance precipitation reflectivity. Liquid hydrometeors (e.g. raindrops) deviate from a sphere when their radius is greater than about 1 mm and have a shape more like that of an oblate spheroid with a flattened base (similar to a hamburger bun) that gives a slightly stronger horizontal return. Hence, current radar systems are typically horizontally polarized to enhance precipitation returns.

However, singly polarized radar systems have severe limitations in regions with partial beam blockage and such systems do not facilitate hydrometeor classification. To overcome these shortcomings of singly polarized weather radar systems, systems with alternating pulses of horizontally and vertically polarized signals have been developed. These dual polarized radar systems, sometimes referred to as "polarimetric weather radars," offer several advantages over conventional radars in estimating precipitation types and amounts. Foremost among these advantages are the capability to discriminate between hail and rain, detect mixed phase precipitation, and estimate rainfall volume.

Current dual polarized radar systems utilize polarization that is altered sequentially between linear vertical and linear horizontal to capture data enhancing values, such as, for example: (1) reflectivity factors at both horizontal and vertical polarization; (2) differential reflectivity for two reflectivity factors; (3) cumulative differential phasing between the horizontally and vertically polarized echoes; (4) correlation coefficients between vertically and horizontally polarized echoes; and (5) linear depolarization ratios. In addition, Doppler velocity and spectrum width can be obtained by suitably processing the horizontally and vertically polarized return signals.

Dual polarized radar systems also allow for the implementation of precipitation classification schemes from inference radar processing of hydrometeor shapes as discussed in various papers authored by practitioners who work in these areas, such as, Ryzhkov, Liu, Vivekanandan, and Zrnic. In addition, by looking at phase differences between the horizontal and vertical components, the effects of partial beam blockage can be mitigated and greater clutter rejection can be obtained.

Figure 1:
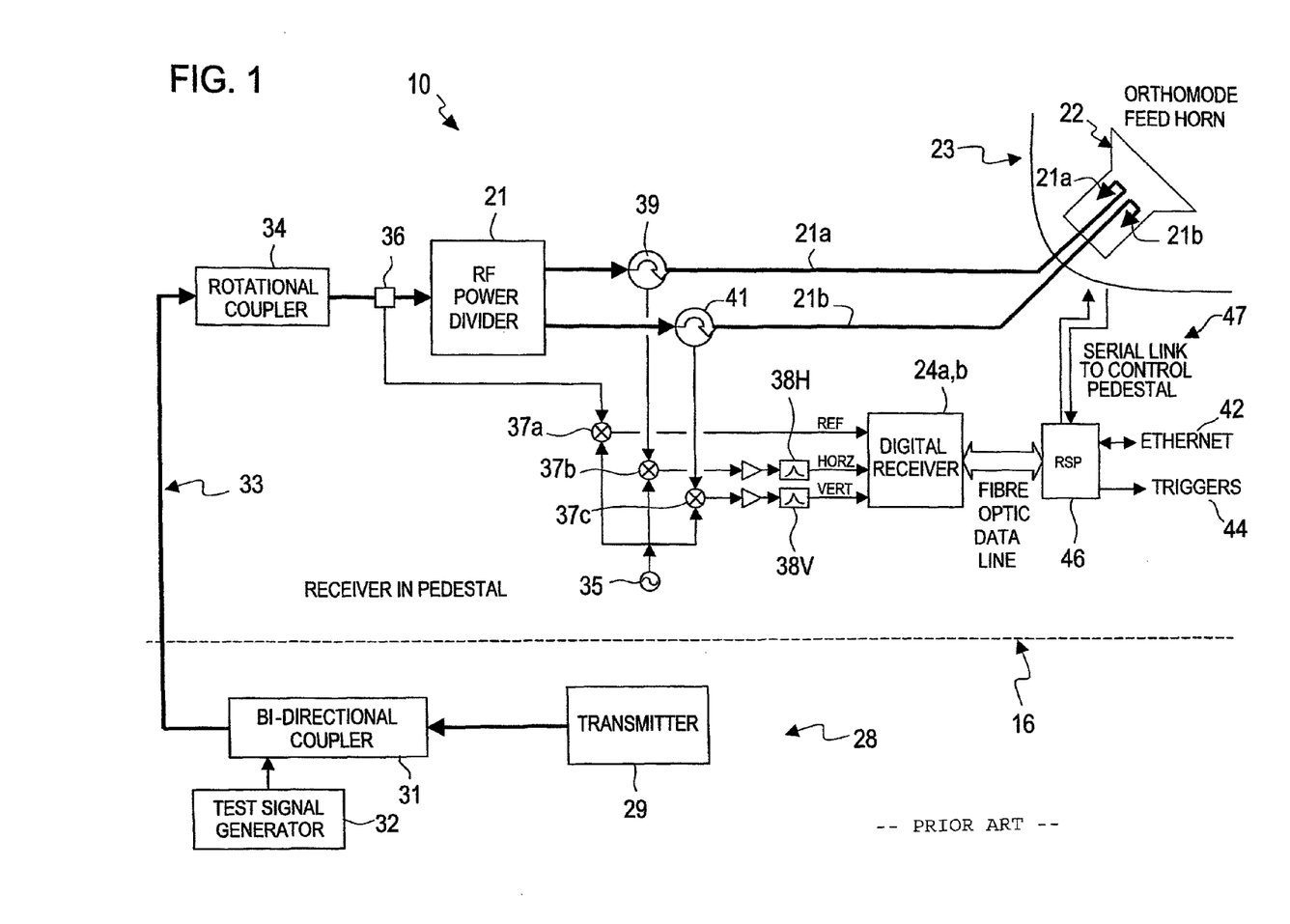
FIG. 1 is a diagram of a representative dual polarization radar system in which the radar signal processor is co-located with the digital receiver.

Many current dual polarization weather radar systems locate the radar system processor above the elevation and rotary coupler and above the requisite pedestal mounting 16 with feed horns and antenna as shown in representative system 10 at FIG. 1.

Zrnic disclosed a theoretical simultaneous dual polarized radar system by replacing the orthomode switch with a power splitter and an orthomode coupling at the antenna feed horn in U.S. Pat. No. 5,500,646. Zrnic also worked out the various calculations pertaining to simultaneous dual polarization radar systems as recorded in the '646 patent, not already known in the industry, and such calculations are hereby incorporated by reference for background information into this disclosure and are applicable for the presently disclosed systems. While Zrnic displays a theoretic simultaneous dual radar system, a number of systems exist today for the actual capturing of radar reflectivity data and incorporation into local workstations or a nation-wide network of radar installations. One such system is disclosed in a white paper authored by A. Zahrai and D. Zrnic entitled Implementation of Polarimetric Capability for the WSR-88D (NEXRAD) Radar, published in American Meteorological Society in 1997 in section 9.5, which is hereby incorporated by reference. Additional comments pertaining to the capturing of reflectivity data and the processing of such data will not be made as these incorporated references describe the basic theory and operation of such systems and such information is already understood in the industry and not necessary for a complete understanding of the herein described invention. Dual polarization weather radar systems are disclosed by Alford in U.S. Pat. Nos. 6,803,875, 6,859,163 and 7,049,997, which are incorporated by reference for background information in this disclosure.

Practical problems exist in the current dual polarization weather radar systems and in the above referenced Alford models. Locating the digital receiver and processor below the elevation rotary coupler 34 in the radar pedestal increases the number of necessary waveguide channels traveling through the rotational coupler. Dual channel rotary couplers are expensive and they also introduce phase errors between channels that vary with rotation. Such errors require complex compensation processing in the received radar returns limiting the reliability of reflectivity data in simultaneous dual polarization weather radar systems. Locating the signal processor below the elevation rotary coupler 34 creates problems in data transmission from the receivers to the signal processors. First, a complex and expensive slip ring would be required to transmit the data. Second, streaming raw I/Q data digitally over long distances introduces errors into the data resulting from noise introduction in the transmission cables. Due to the relatively large data bandwidth required in a dual simultaneously polarized radar system, differential parallel transmission lines must be utilized and data integrity can be impacted in electrically noisy environments. Providing an alternate path for data transmission from the receivers to the signal processors would simplify the slip ring assembly by requiring only paths for power, reference, Ethernet communications, and antenna motor drives.

In addition, the "receiver over elevation" configuration 10 such as is shown in FIG. 1, locates active electronics, such as the receiver and signal processor, in an enclosure in the pedestal. The enclosure must be environmentally controlled with, for example, solid state heating and cooling units. Components may fail under high thermal loads and a simultaneous dual polarization radar system may experience changes in performance as temperature fluctuates. Maintaining a known environment can be costly and difficult, especially when the required known environment is located high up, above the elevation rotary coupler 34 in the radar pedestal.

Therefore, what is needed is an improvement in dual polarization weather radar systems from the current methods of locating the signal receiver and/or the signal processor above the elevation rotary coupler 34, or locating both the signal receiver and the signal processor below the elevation rotary coupler 34. An alternate data path for data transmission from the receivers to the signal processors is needed.

SUMMARY OF THE INVENTION

In summary, a simultaneous dual polarization radar system is disclosed repositioning critical processing components below the rotary joint to avoid radar emission pulse train corruption due to waveguide phase error introductions and to fully capitalize on the simultaneous transmission of polarized signals. A fiber optic rotational coupler is introduced to allow an improved alternate data path for data transmission from the receivers to the signal processors and to allow for transmitting reflected signal returns from the receiver subsystem located above the elevation rotary coupler to the radar system processor located below the elevation rotary coupler.

BRIEF DESCRIPTION OF THE DRAWINGS

A dual polarization radar system incorporating the features of the invention is depicted in the attached drawings which form a portion of the disclosure and wherein.

DESCRIPTION OF THE PREFERRED EMBODIMENTS

Referring to the drawings for a better understanding of the function and structure of the invention, FIG. 1 shows the basic active electronics simultaneous dual polarization radar system, such as the receiver and signal processor, are located in small shielded enclosures. The enclosures should be environmentally controlled with, for example, solid state heating and cooling units. Maintaining a stable thermal environment is crucial to proper operation of the radar system. Components may fail under high thermal loads and a simultaneous dual polarization radar system may experience changes in performance as temperature fluctuates. For example, changes to the phase and frequency stability could be encountered, thereby limiting the ability to receive reliable weather data. However, maintaining a known environment can be accomplished by utilizing solid state (e.g. Peltier) cooling-heating technology. In light of recent component size reductions and power consumption, environmental control and repositioning of the digital receiver 24 into a location adjacent to the radar antenna has become feasible. Therefore, Peltier based temperature controls provide a satisfactory solution to controlling encountered environmental conditions. Because the radar signal processor 46 is located below the elevation rotary coupling, environmental control of and access to its enclosure is simplified.

As will be understood by those in the art, one potential disadvantage of Zrnic's '646 system is the division of transmit power. An operator wanting to transmit and analyze data in a single polarization mode at 500 KW will require, for example, a 1 MW transmitter. A solution to this issue is to insert a mechanical transfer switch into the waveguide structure 33 that allows the waveguide signal to bypass the power divider 21, as shown. Mechanical waveguide switches 25a,b are used to transfer energy around the RF power divider 21, thus bypassing the function it provides. Switch 25a is positioned just before the input port to the divider 21 so that the full power radar pulse train can be redirected around the divider 21 to switch 25b on demand. The system is suitably designed such that the switches do not operate unless the transmitted power is off so that no switching in this mode can take place with the transmitter generating RF energy pulses. Thus, full transmit power can be achieved in a single polarization mode. This bypass configuration allows for maximum pulse train power to be applied to the horizontally polarized channel 21a, while allowing for reception in both polarization modes. As will be understood to those in the industry, transferring power to a single polarization does not limit the possibility of receiving in both vertical and horizontal polarizations. In the bypass mode, linear depolarization ratio ("LDR") information on selected atmospheric areas can be obtained. The waveguide transfer switches utilized in this embodiment are relatively slow mechanical switches operating on the order of a few hundred milliseconds and are actuated through either a solenoid or motor drive. Suitable mechanical switches are offered by Advanced Switch Technology, Kingston, Ontario, model# AST-187, or similar switches.

For magnetron based radar systems, the receiver measures the phase-frequency relationship on a pulse basis. A burst sample is obtained prior to the RF Power divider 21 at tap 36 and transmitted via a coupler 37a to the receiver 24 for processing. This technique yields the highest possible coherency, approaching the theoretical limit for magnetron systems. Suitable coaxial magnetrons can be purchased from Communications and Power Industries, Beverly Division ("CPI"), located in Beverly, Mass., offering a C band 250 KW unit under the model number VMC-1891A. Other frequency and power configuration units are also available from CPI to enable proper sampling.

Figure 2:
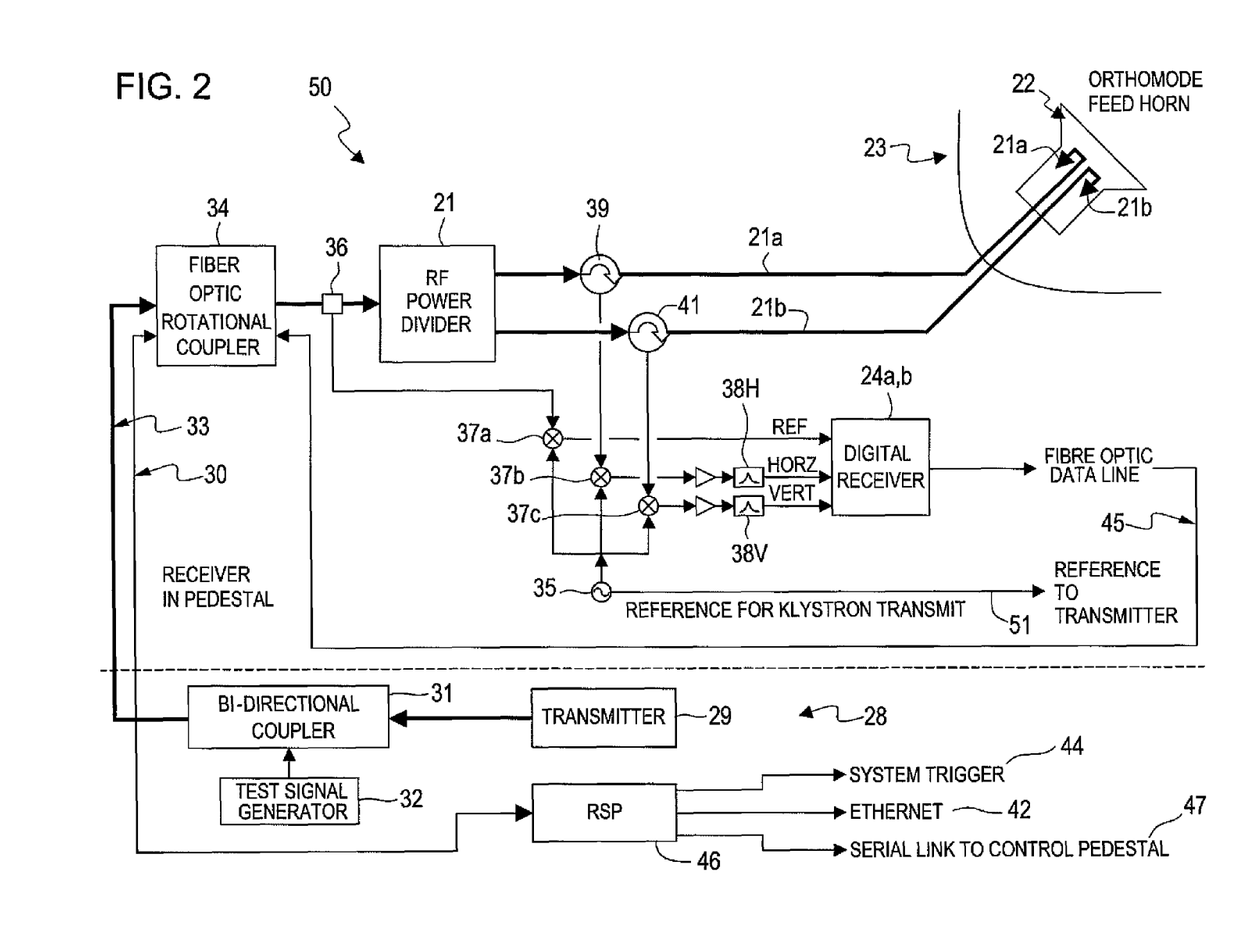
FIG. 2 is a diagram of a preferred simultaneous dual polarization radar system having the radar processor positioned below the rotational joint and incorporating a Klystron transmitter; and, FIG. 3 is a diagram of a preferred simultaneous dual polarization radar system having the radar processor positioned below the rotational joint with an optional power divider bypass.

Alternatively, Klystron based radar systems 50 as shown in FIG. 2 require a local oscillator 35 positioned at the receiver and a timing reference signal 51 used to establish phase-lock to a master synthesizer located at the transmitter 29. As in a magnetron system 20 shown in FIG. 3, the actual transmitted burst signal is sampled and processed by the receiver via tap 36. Therefore, compensation for the phase shift introduced by the amplification process is automatic, again allowing for very high coherency values. Suitable pulsed Klystron amplifiers can be obtained from CPI under the part number series VKC The high speed switch sometimes utilized in old dual polarized radar systems has been replaced in the current design by the RF power divider 21. In addition, two circulators, sometimes referred to as "duplexers" in the industry, a horizontal feed circulator 39 and a vertical feed circulator 41, have been added to provide transmitter and receiver isolation. The circulators utilized are typical ferrite circulators with preferably three, but possibly four ports—four ports giving better isolation and reflection characteristics. A suitable circulator for the present system is model part number CC#-35 available from Ferrite Components, Inc.

FIG. 2 shows a system similar to the system in FIG. 1, but using the Klystron amplifier referenced above and incorporating an improved optical data path from the receiver subsystem 24a,b to radar signal processor 46. Transmitter subsystem 28 can be based upon various known types, such as a power amplifier, a power oscillator (e.g. a magnetron), or a pulsed Klystron amplifier. A bi-directional coupler 31 connects the output from the transmitter 29 to primary waveguide conduit 33 and allows for test signal injection into the radar system from a test signal generator 32.

Fiber optic data line 45 transmits the reflectivity signals from the digital receiver 24 through the fiber optic rotational coupler 34. Fiber optic data line 30 transmits the reflectivity signals from the fiber optic rotational coupler 34 to the radar signal processor 46. Fiber optic data lines 30 and 45 allow for the transfer of large amounts of real-time radar data to the radar signal processor 46, as well as control signals to the electrical components located above the fiber optic rotational coupler 34. The fiber optic data is transmitted through the fiber optic rotational coupler 34 to the radar signal processor. The fiber optic data line 30 bypasses the by-directional coupler 31, and slack is provided in the fiber optic data line to account for the movement of the by-directional coupler 31.

The fiber optic rotational coupler 34, as will be discussed below, allows for locating the digital receiver above the elevation rotary coupling and placing the receivers 24 very close, physically, to the antenna 23, without the addition of expensive and complicated slip rings or errors associated with streaming raw I/Q data digitally over long distances. By providing an alternate path for data transmission from the receivers to the signal processor, the slip ring assembly at most provides only paths for power, reference, Ethernet communications and/or antenna motor drives. The fiber optic rotational coupler 34 allows for locating the radar signal processor below the elevation rotary coupling inside a suitable environmental enclosure suitably distanced from the pedestal and/or the other electronic components, and conveniently accessible for maintenance.

Waveguide signal feedback port 36 (i.e. a signal tap) provides a reference signal to the digital receiver 24 via signal mixers 37a-c. The reference signal provides a feedback mechanism to the receiver 24 to compensate for phase shifts introduced in the waveguide 33 or in the fiber optic rotational coupler 34, among other types of signal changes that might occur after transmitter pulse discharge. The RF power divider 21 then divides the transmitter signal into two equal waveguides of equal power. Circulators 39 and 41 then isolate the output from power divider 21 to allow for propagation of reflected signals through waveguides 21a and 21b to be collected by the digital receiver 24 after being amplified through power amplifiers 38H and 38V.

An Ethernet transceiver 42 allows for data output and programming of the receiver 24 or programming of the radar signal processor 46. System trigger 44 provides a method for synchronized initiation of the transmitter subsystem 28 under the digital processor's control. Antenna rotation and positioning occurs via serial link control 47 to various drive motors in the antenna pedestal from the radar signal processor 46. The system trigger 44 and serial link control 47 may be handled by the radar signal processor 46. Although the control signals 42, 44 and 47 can be controlled by other computers, the actual implementation of these would occur through the fiber optic line 45. The configuration shown in FIG. 2 positions the receiver electronics in the radar antenna pedestal above the elevation rotary coupler.

Figure 3:
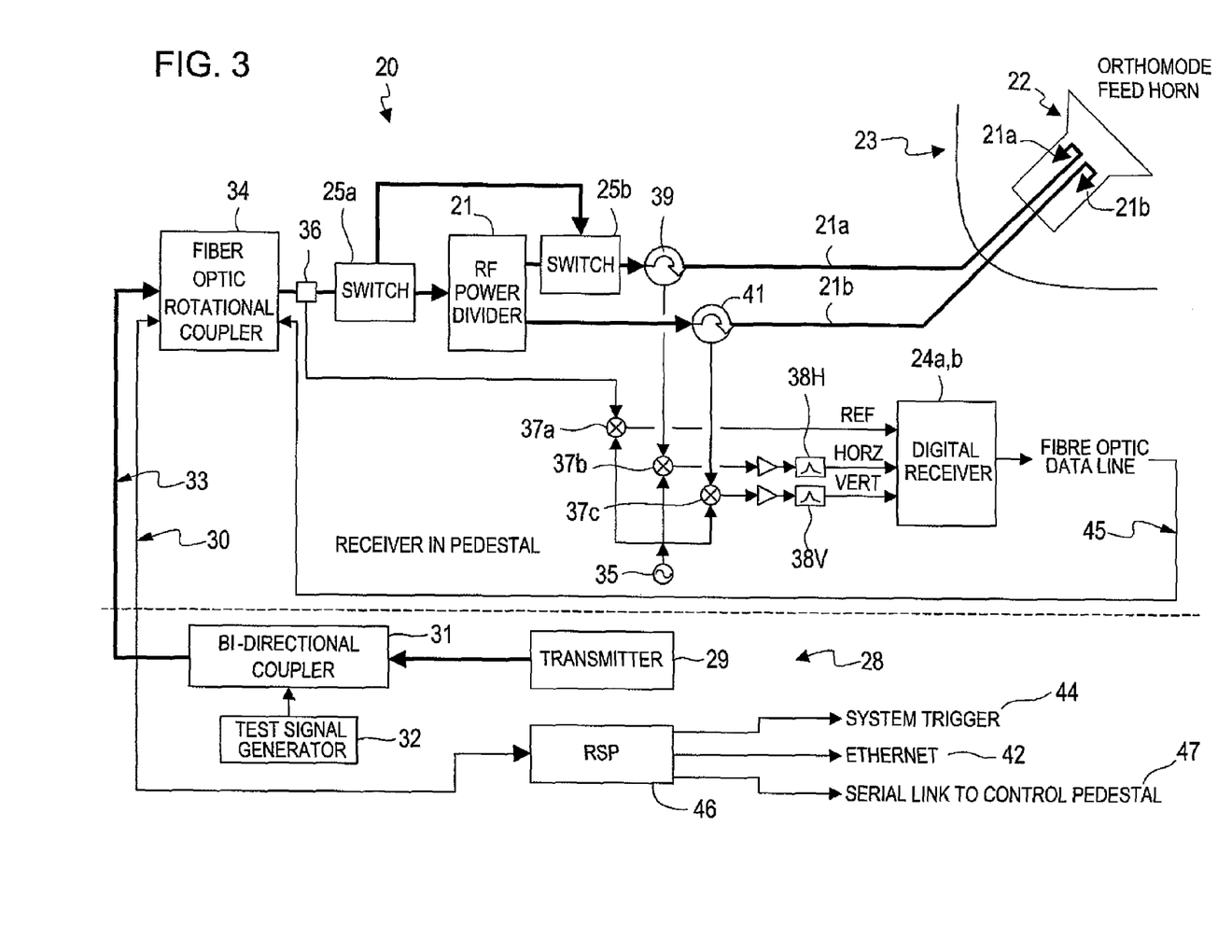

FIG. 3 shows a block diagram representation of a relatively economical solution to create an improved dual polarization radar system 20. A radio frequency ("RF") power divider 21 splits the transmitted energy into components 21a, 21b that are transmitted to each of the polarization feeds 21a,b of the orthomode feed horn 22, appropriately positioned on a parabolic antenna 23. Two receivers are utilized 24a,b, one for each polarization mode as shown. A suitable power divider can be obtained from Coleman Microwave Co., located in Edinburg, Va.

Figure 4:
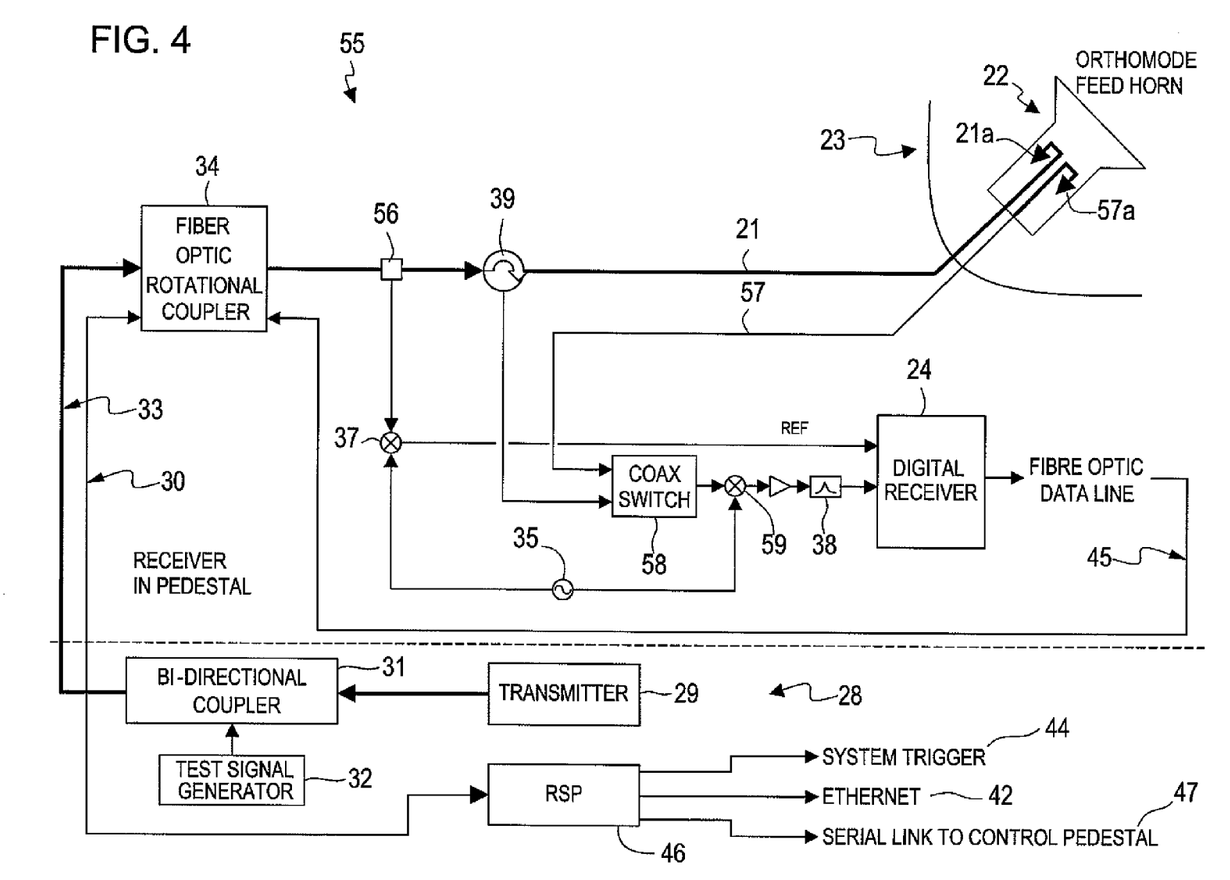
FIG. 4 is a diagram of a low cost dual polarization receiving system to allow for collection of linear depolarization ratios having the radar processor positioned below the elevation rotary coupler.

Referring now to FIG. 4, it may be seen that a relatively inexpensive fiber optic rotational coupling design can be obtained implementing dual simultaneous polarity reception. As shown, bypass 25 and power divider elements 21 have been replaced by a tap port 56 that allows for reference signals to be shunted to mixer 37 and mixer 59. The maximum power, horizontally polarized pulse train 21 proceeds through circulator 39 and to feed horn 22 via port 21a. The orthomode feed horn then simultaneously receives both horizontally (21a) and vertically (57a) polarized reflection signals, and a coaxial switch 58 under radar processor control (or other suitable logic control) processes either the horizontal 21 or vertical 57 reflection components as dictated by associated radar processor control software. The resultant system reduces the receiver hardware required and allows for economic reception and processing of LDR data.

Figure 5:
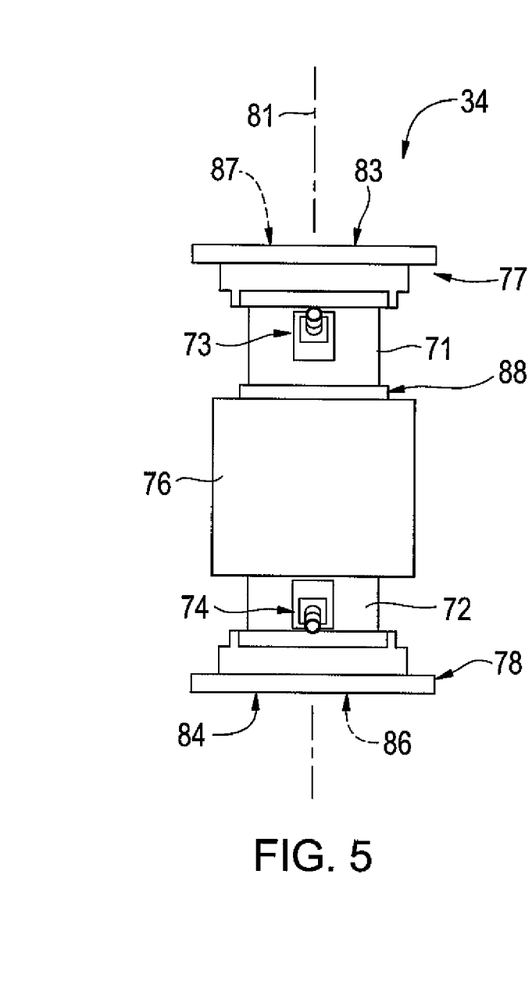
FIG. 5 is an elevational view of the fiber optic rotational coupler.

Referring now to FIG. 5, it may be seen that fiber optic rotational coupler 34 includes an upper housing portion 71 and a lower housing portion 72. The upper and lower housing portions are connected via central bearing housing 76 with upper housing portion 71 being rotatably supported on central bearing housing 76 via bearing 88. Housing 76 and lower housing portion 72 are fixed relative to one another. Upper housing portion 71 includes an upper optical connector port 73 and lower housing portion 72 also includes a lower optical connector port 74. Rotational coupler 34 includes an upper mounting flange 77 that includes fastener apertures 79 to fasten coupler 34 with waveguide conduit tubing and support structure leading to the power divider 21 and antennae assembly 23. Similarly, coupler 34 includes a lower mounting flange 78 for connecting the coupler 34 with a lower waveguide assembly 33 leading to transmitter 29. Coupler 34 also includes an axis 81 extending through the center longitudinally of its elements that defines the axis of rotation of the upper portion 71.

Figure 6:
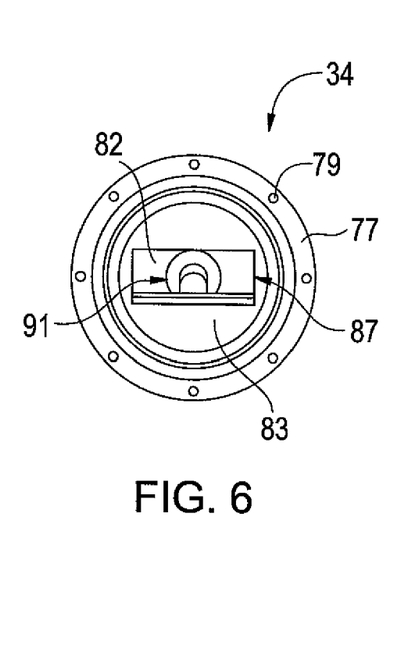
FIG. 6 is a superior view of the fiber optic rotational coupler showing the interior coaxial conduit.

Referring to FIG. 6 in combination with like labeled elements to FIG. 5, it may be seen that upper mounting flange 77 includes upper waveguide alignment face 83 that defines an upper waveguide alignment aperture 87. Aperture 87 extends along axis 81 in the form of a rectangular tube and has an interior 82 that is filled with a pressurized gas to facilitate transmission of waveguide signal energy within radar system 20 waveguide conduits. The rectangular tube terminates at its lower end at alignment aperture 86 in faceplate 84. Hence, flanges 77 and 78 typically include seals in radial grooves at the perimeter of faceplates 83 and 86 to maintain pressurization integrity of the waveguide assemblies.

As shown, interior 82 includes a coaxial waveguide member 91 that emerges from an interior wall of the rectangular interior 82 and extends along axis 81 for a majority of the interior length of 82 before proceeding back into interior wall of interior 82 in proximity to lower mounting flange 78. Coaxial waveguide member 91 includes two radio frequency ("RF") chokes located within the inner and outer conductors of the coaxial member 91 at the center of housing 76 that allow the upper portion of member 91 to rotate relative to a lower portion of member 91 and also serve as an RF and microwave signal connection for both the inner and outer conductors of the coaxial member 91. Hence, coaxial member 91 has an upper portion that rotates in fixed relation within housing portion 71 relative to bearing housing 76 and a lower stationary portion fixed within stationary lower housing portion 72 and bearing housing 76. The aforementioned structure allows free rotation of elements 77, 73, and 71 and the upper portion of member 91 relative to its lower elements 72, 74, and 78, while permitting signal propagation through coupling 34, and while maintaining an very desirable voltage standing wave ratio ("VSWR").

Figure 7:
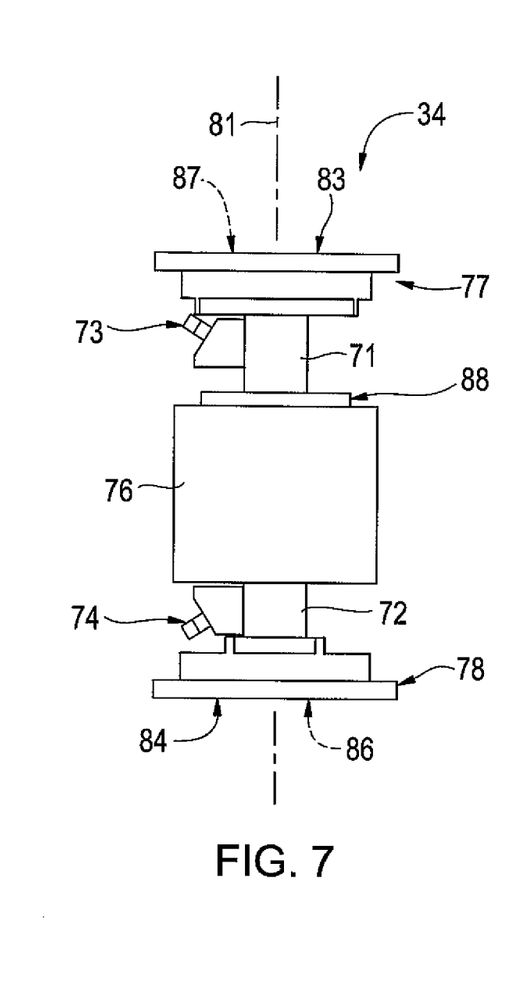
FIG. 7 is a 90° rotated elevational view of the fiber optic rotational coupler of FIG. 5.

As more clearly shown in FIG. 7, coupling 34 includes ports 73 and 74 to connect optical fiber cabling from digital receiver 24 to the radar signal processor 46. Coaxial member 91 includes a second channel within its interior housing a fiber optic cable that extends from ports 73 and 74 to the longitudinal center of coaxial member 91, and this fiber optic cable may be of the single-mode or multi-mode varieties. The fiber optic cable running between each port is bisected at the center of housing 76 at the location of the aforementioned chokes. At the point of bisection of the fiber optic cable at the location of the chokes each fiber optic line includes fiber optic tapers that expand the photonic beam within the optic cable to a larger diameter. Since the terminus of each optic cable are in close proximity and aligned, although not in direct contact, any signals within the beam traverse the gap between each terminus without significant signal degradation. The radiating elements within the taper also minimize reflections such that no tubing is required to overlap the terminus ends. This arrangement maintains a low VSWR throughout the high-speed fiber optic signal path from receiver 24 to radar signal processor 46.

As will be understood, the above configuration of rotary joint 34 is an "in-line" type that provides for inherent mechanical stability and does not require the addition of a fixed plate to stabilize the joint 34 during rotation. Both the fiber optic and waveguide channels rotate around axis 81, and both the optical channel and the RF channels do not electrically interfere with one another. Hence, a fiber optic path defined by 45 and 30 can transmit data at very high rates, and typically at rates greater than 800 Mb/second. This allows for raw radar reflectivity data to be digitized and transmitted to radar signal processor along path 45/30 to be processed in real-time.

The disclosed embodiments teach a practical dual polarization weather radar system allowing for the repositioning of critical processing components below the rotary joint without the expense and error issues normally associated with transmitting data from above the elevation rotary coupler to below. These new designs eliminate the current problems experienced in current dual polarization radar systems of expensive, error prone data transmission components and expensive environmental controls.

The benefits of practical, reliable, and relatively inexpensive simultaneous dual polarization systems using an optical communications link are substantial. They provide much more information about hydrometeors, allowing for the determination of an entire scattering matrix and the correction for partial beam blockage via differential phase techniques, improved rainfall estimates, and improved hydrometeor classification.

While I have shown my invention in one form, it will be obvious to those skilled in the art that it is not so limited but is susceptible of various changes and modifications without departing from the spirit thereof.

REFERENCES

1. Doviak, R. J., V. Bringi, A. Ryzhkov, A. Zahrai, D. S. Zrnic'. *Considerations for Polarimetric Upgrades to Operational WSR-88D Radars. J. Atmos. and Oceanic Tech,* 2000. 17, 257-278.
2. Liu, Y., J. W. Conway, E. A. Brandes, A. V. Ryzhkov, J. Vivekanandan, D. S. Zrnic, and R. Oye. *The use of polarization data in the operational identification of hydrometeor and non-hydrometeor targets.* Preprints, 29th Conf. Radar Meteor. Montreal, Canada: American Meteorological Society 1999:178-179
3. Ryzhkov A., R. López, R. Fulton, D. Zrnic, T. Schuur, and Y. Liu. "Hydrometeor classification with a polarimetric radar for improved rainfall measurements and detection of hail and electrically charged regions. Preprints, 29th Conference on Radar Meteorology Montreal, Canada: American Meteorological Society, 1999: 289-292.
4. Ryzhkov, A. V. and D. S. Zrnic. "Discrimination between rain and snow with a polarimetric radar." *Journal of Applied Meteorology* 1999: 1228-1240.
5. Ryzhkov, A. V., D. S. Zrnic, and R. Fulton. "Area Rainfall Estimates Using Differential Phase." *Journal of Applied Meteorology* 2000: 263-268.
6. Skolnik, Merrill I. *Introduction to Radar Systems.* New York: $3^{rd}$ ed 2001.
7. Vivekanandan, J., D. S. Zrnic, S. M. Ellis, R. Oye, A. V. Ryzhkov, and J. Straka. "Cloud microphysics retrieval using S-band dual-polarization radar measurements." *Bulletin of the American Meteorological Society* 1999: 381-388.
8. Zahrai Allen and Dr. Dusan Zrnic. "Implementation of Polarimetric Capability for the WSR-88D (NEXRAD) Radar." Long Beach, Calif. *American Meteorological Society* 1997.
9. Zrnic, D. S., and A. V. Ryzhkov. "Polarimetry for weather surveillance radars." *Bulletin of the American Meteorological Society* 1999: 389-406.

Having set forth the nature of the invention, what is claimed is:

1. A weather radar system having a support pedestal, comprising:
   a. an energy pulse train generator for producing radio emissions adapted for weather radar use;
   b. a radio frequency power divider in electrical communication with said pulse train generator for splitting said radio emissions into simultaneous dual emission components;
   c. an antenna in electrical communication with said power divider for transmitting said simultaneous dual emission components into space in a controlled manner and for collecting reflected signals from objects of interest;
   d. an orthomode feed horn positioned on said antenna for altering one of said emission components to have a different phase relative to said other emission component during transmission and for collecting reflectivity signals of disparate phase relative to one another;
   e. a rotational coupling rotationally supporting said antenna, said rotational coupling including a hollow radio frequency waveguide channel portion for the transmission of radio waves therethrough;
   f. a receiver subsystem in electrical communication with said antenna for capturing reflectivity signals collected by said antenna; and g. a radar system processor in communication with said receiver subsystem for processing reflectivity signals collected by said antenna; and, h. an optical coupler centrally disposed within said rotational coupling for passing optical transmissions from said receiver subsystem to said system processor through said rotational coupling, wherein said optical coupler is disposed within said waveguide channel portion.

2. A radar system as recited in claim 1, wherein said rotational coupling comprises, a rotating upper part and a stationary lower part, said waveguide channel portion centrally disposed within said rotational coupling, a first connector port positioned on said upper part for receiving an upper fiber optic cable running from said receiver subsystem, a second connector port positioned on said lower part for receiving a lower fiber optic cable extending downward from said radar system, whereby said optical coupling connects said upper fiber optic cable and said lower fiber optic cable to form an optical communications link.

3. A radar system as recited in claim 2, further including a pair of channel circulators in electrical communication with said antenna and said receiver subsystem for isolating said dual emission components from said receiver subsystem.

4. A radar system as recited in claim 3, wherein said energy pulse train generator comprises a Klystron signal generator and wherein said radar system further comprises a reference signal tap in electrical communication with one of said circulators to provide a reference signal to said klystron signal generator.

5. A radar system as recited in claim 2, further including a bypass switch in electrical communication with said pulse train generator and said antenna to selectively allow full radio emissions transmission power to be transferred to said antenna.

6. A radar system as recited in claim 2, wherein said rotational coupler comprises an in-line rotational coupling.

7. A radar system as recited in claim 6, wherein said radar system uses said optical communications link to control pedestal movement.

8. A radar system as recited in claim 7, wherein said radar signal processor is located below said radar pedestal.

9. A radar system as recited in claim 1, wherein said radar signal processor is located below said radar pedestal.

10. A radar system as recited in claim 1, wherein said communications link transmits weather reflectivity data signals at a speed of 800 mega-bits per second or greater.

11. A weather radar system having a support pedestal, comprising:

a. means for generating radio emissions adapted for weather radar use;

b. means in electrical communication with said generating means for dividing said radio emissions into simultaneous dual emission components;

c. an antenna for transmitting said simultaneous dual emission components into space in a controlled manner and for collecting reflected signals from objects of interest;

d. means positioned on said antenna for altering one of said emission components to have a different phase relative to said other emission component during transmission and for collecting reflectivity signals of disparate phase relative to one another;

e. means in electrical communication with said antenna for receiving reflectivity signals collected by said antenna;

f. processing means in communication with said receiver means for g. coupling means for supporting said antenna and said receiving means in rotational relation to said pedestal, wherein said rotational coupling means includes means for the transmission of radio waves through a hollow channel; and h. optical coupler means disposed within said rotational coupling means for passing optical transmissions from said receiving means to said processing means, wherein said optical coupler means is disposed within said radio wave channel transmission means.

12. A radar system as recited in claim 11, wherein said rotational coupling means comprises a rotating upper part and a stationary lower part, said radio wave channel transmission means centrally disposed within said rotational coupling means, wherein said optical coupling means is coaxially disposed within said radio wave channel transmission means, a first connector port positioned on said upper part for receiving an upper fiber optic cable running from said receiver means, a second connector port positioned on said lower part receiving a lower fiber optic cable extending downward from said radar system, whereby said optical coupling means connects said upper fiber optic cable and said lower fiber optic cable to form an optical communications link.

13. A radar system as recited in claim 12, further including means in electrical communication with said emissions generator means and said antenna for bypassing said radio emissions divider means to selectively allow full radio emissions transmission power to be transferred to said antenna.

14. A radar system as recited in claim 13, wherein electrical components above said rotational coupling means are controlled by sending signals through said optical communications link.

15. A radar system as recited in claim 14, wherein said radar system uses said optical communications link to control pedestal movement.

16. A radar system as recited in claim 15, wherein said radar signal processor is located below said radar pedestal.

17. A radar system as recited in claim 11, wherein said radar signal processor is located below said radar pedestal.

18. A radar system as recited in claim 12, wherein said communications link transmits weather reflectivity data signals at a speed of 800 mega-bits per second or greater.

19. A radar system as recited in claim 18, further including a wave guide signal port located between said radio emissions divider means and said emissions generator means for extracting a reference signal from said radio emissions for use by said receiving means, and wherein said reference signal is transmitted through said receiver means via said optical communications link.

20. A method for utilizing simultaneous dual polarized radio emissions in a radar system having a radar pedestal, comprising the steps of:

a. generating a radio emission suitable for radar system usage;

b. splitting said radio emission into dual emission components;

c. passing said emission components through an orthomode feed horn to alter the phase of one of said components by substantially 90 degrees with respect to said other component;

d. simultaneously directing dual polarized emissions into space in a controlled manner;

e. collecting polarized emission reflections from objects of interest resulting from said step of directing said dual polarized emissions into space;

f. passing said collected polarized emission reflections to a receiver subsystem co-located with said antenna and digitizing them;

g. passing said digitized data through an optical communications link disposed within a hollow radio frequency waveguide channel disposed within rotational coupler supported by said radar pedestal; and, h. processing said digitized data in a radar signal processor located below said radar pedestal.

21. A method as recited in claim 20, further including the step of passing said digitized data through a fiber optic channel disposed within a wave guide channel coaxially positioned within said rotational coupling.

22. A method as recited in claim 21, wherein said step of passing said digitized date through said fiber optic channel in said rotational coupling occurs at a data signal speed of 800 mega-bits per second or greater.

23. A method as recited in claim 22, wherein said collecting step comprises the steps of collecting said emission reflections in an antenna and focusing said collected reflections into an orthomode feed horn to create separate reception signals substantially 90 degrees out of phase with one another.

24. A method as recited in claim 20, further including the step of sending radar antenna orientation commands through said optical communications link.

\* \* \* \* \*